United States Patent
Wi et al.

(10) Patent No.: US 10,247,302 B2
(45) Date of Patent: Apr. 2, 2019

(54) APPARATUS FOR CONTROLLING AUTOMATIC TRANSMISSION AND METHOD OF CONTROLLING AUTOMATIC TRANSMISSION

(71) Applicant: HYUNDAI MOTOR COMPANY, Seoul (KR)

(72) Inventors: Taehwan Wi, Incheon (KR); Chang Wook Lee, Suwon-si (KR); Dokyung Yim, Seoul (KR); Chong Tae Yang, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 193 days.

(21) Appl. No.: 15/244,665

(22) Filed: Aug. 23, 2016

(65) Prior Publication Data

US 2017/0167600 A1    Jun. 15, 2017

(30) Foreign Application Priority Data

Dec. 14, 2015    (KR) ........................ 10-2015-0178657

(51) Int. Cl.
*B60W 10/10*    (2012.01)
*F16H 61/02*    (2006.01)
*B60W 30/19*    (2012.01)
*B60W 30/186*    (2012.01)

(52) U.S. Cl.
CPC ..... *F16H 61/0204* (2013.01); *F16H 61/0213* (2013.01); *B60W 10/10* (2013.01); *B60W 30/186* (2013.01); *B60W 30/19* (2013.01); *F16H 2061/0244* (2013.01); *F16H 2306/14* (2013.01); *Y10T 477/69362* (2015.01); *Y10T 477/693625* (2015.01); *Y10T 477/693635* (2015.01)

(58) Field of Classification Search
CPC ... Y10T 477/69362; Y10T 477/693625; Y10T 477/693635; B60W 10/10; B60W 30/186; B60W 30/19; F16H 61/0204; F16H 61/0213; F16H 2306/14; F16H 2061/0244
USPC ........................................ 701/55, 56, 59, 60
See application file for complete search history.

(56) References Cited

U.S. PATENT DOCUMENTS

| | | | | |
|---|---|---|---|---|
| 5,063,814 | A * | 11/1991 | Baba | .................. F16H 61/0437 |
| | | | | 477/154 |
| 6,287,238 | B1 * | 9/2001 | Park | .................... F16H 61/0437 |
| | | | | 477/143 |
| 6,732,037 | B2 * | 5/2004 | Jeon | ...................... F16H 61/061 |
| | | | | 701/51 |

(Continued)

FOREIGN PATENT DOCUMENTS

| | | |
|---|---|---|
| JP | 5251925 B2 | 7/2013 |
| JP | 5647488 B2 | 12/2014 |

(Continued)

*Primary Examiner* — Roger L Pang
(74) *Attorney, Agent, or Firm* — Morgan Lewis & Bockius LLP

(57) ABSTRACT

A control apparatus of an automatic transmission includes an electric hydraulic pump including a motor and a pump, an actuator for engaging or releasing a friction element by controlling a hydraulic pressure discharged from the pump, and a transmission control unit (TCU) for correcting a control signal to control the actuator depending on a dynamic characteristic coefficient of the friction element and the actuator during shifting when outputting the control signal to the actuator.

4 Claims, 7 Drawing Sheets

(56) References Cited

U.S. PATENT DOCUMENTS

| | | | | |
|---|---|---|---|---|
| 7,131,931 | B2* | 11/2006 | Lutz | F16H 61/12 |
| | | | | 477/159 |
| 7,440,833 | B2* | 10/2008 | Chen | F16H 61/061 |
| | | | | 477/70 |
| 7,468,016 | B2* | 12/2008 | Miyake | F16H 61/00 |
| | | | | 477/53 |
| 7,608,013 | B2* | 10/2009 | Chen | F16H 61/0437 |
| | | | | 477/132 |
| 8,150,585 | B2* | 4/2012 | Hinami | F16H 61/061 |
| | | | | 477/34 |
| 8,170,761 | B2* | 5/2012 | Kraenzlein | F16K 37/0091 |
| | | | | 701/58 |
| 8,930,099 | B2* | 1/2015 | Inagawa | F02D 29/02 |
| | | | | 477/168 |
| 9,096,214 | B2* | 8/2015 | Terakawa | F02D 29/02 |
| 2009/0280958 | A1* | 11/2009 | Yim | F16H 59/20 |
| | | | | 477/115 |

FOREIGN PATENT DOCUMENTS

| | | |
|---|---|---|
| KR | 10-2004-0048645 A | 6/2004 |
| KR | 10-2008-0045930 A | 5/2008 |

\* cited by examiner

FIG. 5

| Size of a control duty | 0 | 1 | 2 | 3 | 4 | 5 | 6 | 7 | 8 | 9 | A | B | C | D | E | Correction unit |
|---|---|---|---|---|---|---|---|---|---|---|---|---|---|---|---|---|
| | -0.7 | -0.6 | -0.5 | -0.4 | -0.3 | -0.2 | -0.1 | 0 | 0.1 | 0.2 | 0.3 | 0.4 | 0.5 | 0.6 | 0.7 | % |

| Fill time | 0 | 1 | 2 | 3 | 4 | 5 | 6 | 7 | 8 | 9 | A | B | C | D | E | Correction unit |
|---|---|---|---|---|---|---|---|---|---|---|---|---|---|---|---|---|
| | -35 | -30 | -25 | -20 | -15 | -10 | -5 | 0 | 5 | 10 | 15 | 20 | 25 | 30 | 35 | ms |

FIG. 6

| Shift type | Control duty size(%) | Fill time(ms) |
|---|---|---|
| Up shift | 0.1 | 0 |
| Down shift | -0.1 | -10 |
| Kick shift | 0.25 | 5 |
| Skip up shift | 0.2 | 10 |
| Skip down shift | -0.2 | -15 |

APPARATUS FOR CONTROLLING AUTOMATIC TRANSMISSION AND METHOD OF CONTROLLING AUTOMATIC TRANSMISSION

CROSS-REFERENCE TO RELATED APPLICATION

This application claims the benefit of priority to Korean Patent Application No. 10-2015-0178657, filed with the Korean Intellectual Property Office on Dec. 14, 2015, the entire contents of which are incorporated herein by reference.

TECHNICAL FIELD

The present disclosure relates to a control apparatus of an automatic transmission and method for controlling the automatic transmission. More particularly, the present disclosure relates to a control apparatus of an automatic transmission reflecting a hardware deviation for an automatic transmission single part.

BACKGROUND

An automatic transmission controls hydraulic pressure by operating at least one actuator according to a driving state, such as a vehicle speed and a throttle opening, in order to perform shifting to a target shift speed, or ratio.

In a case in which the shifting to the target shift speed is performed, an automatic transmission may have an off-going, or first, friction element that changes from an engaged state to a released state and an on-coming, or second, friction element that changes from a released state to an engaged state. Releasing, or actuating, an off-going friction element and engaging, or actuating, an on-coming friction element may be realized, or implemented, by controlling hydraulic pressure supplied to respective elements.

In addition, the control of the hydraulic pressure supplied to the off-going and on-coming friction elements may be performed by operating a control duty and controlling the actuator according to the control duty.

An electric hydraulic pump may be applied to the automatic transmission and may operate an off-going solenoid to release the off-going friction element (e.g., an off-going clutch) or operate the on-coming solenoid to engage the on-coming friction element (e.g., an on-coming clutch) when a gear is shifted to any gear shift stage in a state in which a pump is driven by an operation of a motor, thereby executing the shifting.

However, when producing an automatic transmission single part, or single parts of the automatic transmission, if a deviation depending on each single part is not considered, an adverse impact may be generated when a gear shifting operation is performed. For example, in the case of the solenoid, the solenoid has a deviation of a discharge rate depending on each part made. In the case of the clutch, a charge time of the oil may be different depending on each part made.

If the collective control is performed in a transmission control unit (TCU) without the accounting for difference of the dynamic characteristics of the automatic transmission single parts, the impact may be generated during a gear shifting operation.

The above information disclosed in this Background section is only for enhancement of understanding of the background of the disclosure and therefore it may contain information that does not form the prior art that is already known in this country to a person of ordinary skill in the art.

SUMMARY

The present disclosure provides a control apparatus of an automatic transmission reflecting a hardware deviation for an automatic transmission single part and a method of controlling the automatic transmission.

A control apparatus of an automatic transmission reflecting a hardware deviation for a single part according to an exemplary embodiment of the present disclosure may include an electric hydraulic pump including a motor and a pump; an actuator for engaging or releasing a friction element by controlling a hydraulic pressure discharged from the pump; and a transmission control unit (TCU) for correcting a control signal to control the actuator depending on a dynamic characteristic coefficient of the friction element and the actuator during shifting to output, or when outputting, the control signal to the actuator.

The control signal may be a size of a control duty and fill time applied to the actuator in an early stage of shifting.

The dynamic characteristic coefficient of the friction element and the actuator may be previously stored in, or accessible to, the transmission control unit, and the transmission control unit may correct the basic compensation value depending on the dynamic characteristic coefficient to correct the size of the control duty and the fill time.

The basic compensation value depending on the dynamic characteristic coefficient may be previously stored in, or accessible to, the transmission control unit in a map table depending on the control duty and the fill time.

The transmission control unit may control the control duty and the fill time to control the friction element and the actuator depending on, or based on, the shift type.

The shift type may include an up shift, a down shift, a kick down shift, a skip down shift and a skip up shift.

The transmission control unit may correct the compensation value, depending on the shift type, to the basic compensation value to output the control signal.

The transmission control unit may corrects the compensation value depending on the shift type.

A control method of an automatic transmission according to another exemplary embodiment of the present disclosure may include determining a basic compensation value based on a dynamic characteristic coefficient of a friction element and an actuator by a transmission control unit; determining a compensation value based on a shift type by a transmission control unit; and outputting a control signal by reflecting the basic compensation value and a compensation value based on the shift type by the transmission control unit.

The basic compensation value based on the dynamic characteristic coefficient may be determined by experiment and may be previously stored in, or accessible to, the transmission control unit in a map table.

The compensation value based on the shift type may be determined by experiment and may be previously stored in, or accessible to, the transmission control unit in a map table.

The control signal may be a size of the control duty and a fill time applied to the actuator in an early stage of shifting.

According to the control apparatus and the method thereof of the automatic transmission according to an exemplary embodiment of the present disclosure, by reflecting the hardware deviation for the automatic transmission single part to control the control duty and the fill time, the shift feel may be improved.

BRIEF DESCRIPTION OF THE DRAWINGS

The drawings are provided for reference to explain an illustrative exemplary embodiment of the present disclosure, and the technical spirit of the present disclosure should not be interpreted to be limited to the accompanying drawings.

FIG. 5 is a view showing a map table of a dynamic characteristic coefficient according to an exemplary embodiment of the present disclosure.

FIG. 6 is a view showing a map table of a transmission action type according to an exemplary embodiment of the present disclosure.

DETAILED DESCRIPTION

Figure 1:
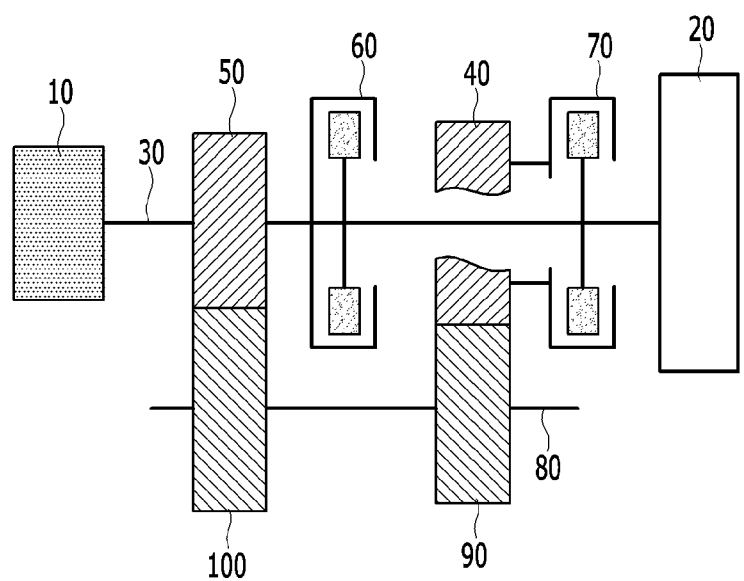
FIG. 1 is a schematic view showing a configuration of an automatic transmission according to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In order to clarify the present disclosure, parts that are not connected with the description will be omitted, and the same elements or equivalents are referred to with the same reference numerals throughout the specification.

The size and thickness of each element may be arbitrarily shown in the drawings, and the present disclosure is not necessarily limited thereto. In the drawings, the thickness of layers, films, panels, regions, etc., may be exaggerated for clarity.

Now, a control apparatus of an automatic transmission according to an exemplary embodiment of the present disclosure will be described with reference to accompanying drawings. First, the automatic transmission applied to the control apparatus of the automatic transmission according to an exemplary embodiment of the present disclosure will be described.

FIG. 1 is a schematic view showing a configuration of an automatic transmission according to an exemplary embodiment of the present disclosure.

As shown in FIG. 1, an automatic transmission according to an exemplary embodiment of the present disclosure may receive torque from an input shaft 30 connected to an engine 10 and transmit the torque to an output shaft 80. In addition, at least one planetary gear set may be interposed between the input shaft 30 and the output shaft 80 such that a rotation speed of the input shaft 30 may be changed into a target rotation speed and the target rotation speed may be transmitted to the output shaft 80. Further, at least one frictional element that selectively connects respective operational members of the planetary gear set with the input shaft 30, a transmission case (not shown), and/or another operational member may be disposed in the automatic transmission. For better comprehension and ease of description, only first and second drive gears 40 and 50, first and second driven gears 90 and 100, an on-coming friction element 60, and an off-going friction element 70 are represented in FIG. 1.

The first drive gear 40 may be disposed on the input shaft 30 and achieve a first speed by operation of the off-going friction element 70. The first drive gear 40 may be engaged with the first driven gear 90.

The second drive gear 50 may also be disposed on the input shaft 30, and achieve a second speed by operation of the on-coming friction element 60. The second drive gear 50 may be engaged with the second driven gear 100.

According to the automatic transmission, when the off-going friction element 70 is operated the first speed, or ratio, may be achieved, and when the on-coming friction element 60 is operated, the second speed, or ratio, may be achieved. Therefore, a shift from the first speed to the second speed may be realized by changing the off-going friction element 70 from an engaged state to a released state and simultaneously changing the on-coming friction element 60 from a released state to an engaged state.

In addition, vehicle inertia 20 may be input to the input shaft 30. The vehicle inertia 20 may be determined by mathematically treating the vehicle as a massive object.

The above-described automatic transmission is one example to which the spirit of the present disclosure can be applied, and the spirit of the present disclosure may be applied not only to the automatic transmission shown in FIG. 1 but also to all automatic transmissions where upshifting is performed by an engagement of one on-coming element and a release of one off-going element.

Hereafter, a control apparatus of an automatic transmission according to an exemplary embodiment of the present disclosure will be described in detail with reference to FIG. 2.

Figure 2:
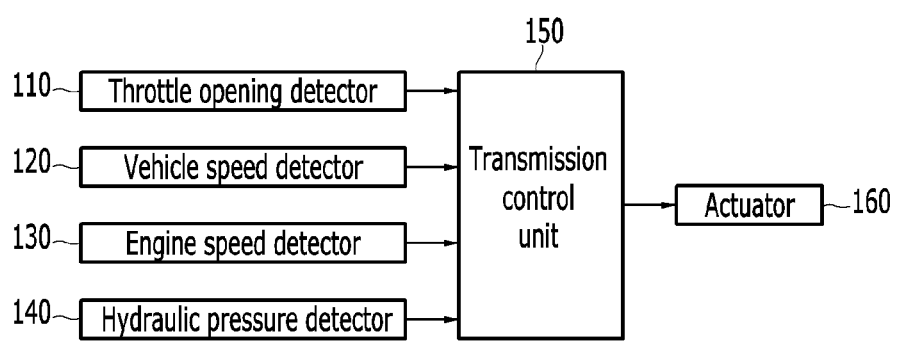
FIG. 2 is a block diagram showing a configuration of a control apparatus of an automatic transmission according to an exemplary embodiment of the present disclosure.

FIG. 2 is a block diagram showing a configuration of a control apparatus of an automatic transmission according to an exemplary embodiment of the present disclosure.

As shown in FIG. 2, the control apparatus of the automatic transmission according to an exemplary embodiment of the present disclosure may include a throttle opening detector 110, a vehicle speed detector 120, an engine speed detector 130, a hydraulic pressure detector 140, a transmission control unit 150 and an actuator 160.

The throttle opening detector 110 may detect a throttle opening that is operated in accordance with an operation of an acceleration pedal, and transmit a signal corresponding thereto to the transmission control unit 150.

The vehicle speed detector 120 may detect a vehicle speed and transmit a signal corresponding thereto to the transmission control unit 150.

The engine speed detector 130 may detect an engine speed by means of a rotational speed of a crankshaft that may rotate according to an operation of the engine 10, and transmit a signal corresponding thereto to the transmission control unit 150.

The hydraulic pressure detector 140 may detect hydraulic pressures applied to respective off-going and on-coming friction elements, and transmit a signal corresponding thereto to the transmission control unit 150.

The actuator 160 may receive the control signal from the transmission control unit 150 to control hydraulic pressure applied to the on-coming friction element 60 and the off-going friction element 70. The actuator 160 may include at least one of control valves and solenoid valves that control hydraulic pressure applied to respective on-coming and off-going friction elements.

Figure 3:
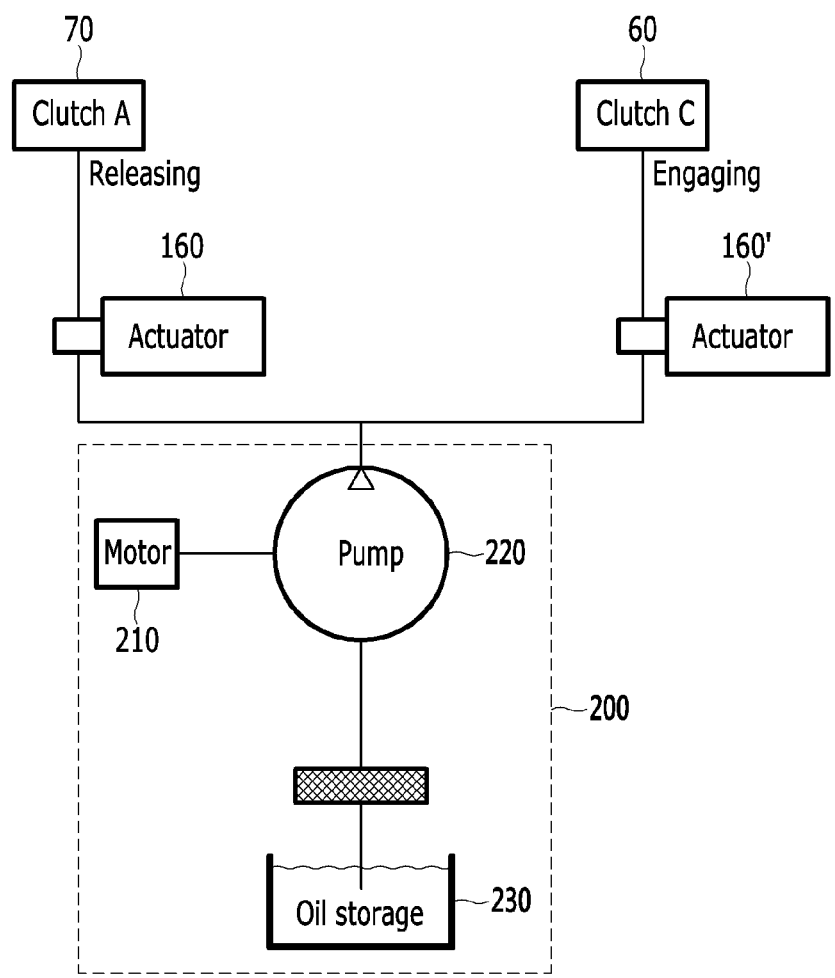
FIG. 3 is a schematic view showing a structure of an electric hydraulic pump according to an exemplary embodiment of the present disclosure.

As shown in FIG. 3, the friction elements 70 and 60 (e.g., the clutch) may receive the hydraulic pressures through the actuator (e.g., solenoid valve) from the electric hydraulic pump 200 including a motor 210 and a pump 220. In an embodiment, the actuator 160 may control the hydraulic pressure discharged from the pump to engage or release the friction elements 70 and 60.

The transmission control unit 150 may be realized by, or include, one or more processors activated by a predetermined program, and the predetermined program may be programmed to perform each step of an upshift control method of an automatic transmission according to an embodiment of this disclosure.

The transmission control unit 150 may correct the control signal to control the actuator 160 depending a dynamic characteristic coefficient of the friction element (e.g., clutch) and the actuator 160 during a shifting operation and transmit the corrected control signal to the actuator 160. In this case, the control signal may be a function of, or influenced by, a magnitude and a fill time of a control duty applied to the actuator in an initial shifting.

Figure 4:
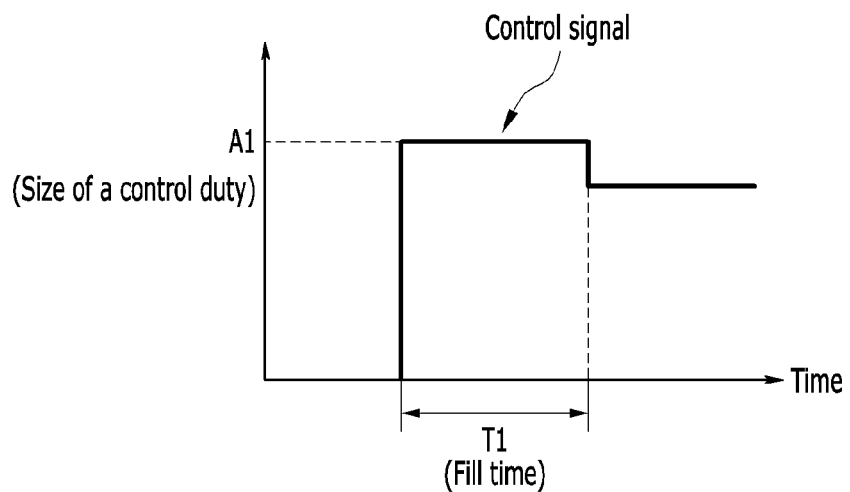
FIG. 4 is a graph illustrating a control signal according to an exemplary embodiment of the present disclosure.

FIG. 4 is a graph illustrating a control signal according to an exemplary embodiment of the present disclosure.

Referring to FIG. 4, a hydraulic pressure supplied to the friction element through the actuator 160 may be performed through a duty control. In this case, in an early stage of shifting, after applying the control duty of a predetermined size A1 (the size of the control duty) during a predetermined time T1 (a fill time) to rapidly supply the hydraulic pressure to the friction element, a size of the control duty may decrease to perform a normal control. That is, the control signal is composed of, or is a function of, the size of the control duty applied to the actuator in the early stage of shifting and the fill time that may be a maintenance time of the control duty.

The transmission control unit 150 may correct the control signal including, or being affected by, the size of the control duty and the fill time depending on the dynamic characteristic coefficient of the friction element and the actuator 160 to output the corrected control signal to the actuator 160.

That is, in the producing process of the automatic transmission or parts thereof, a dynamic characteristic coefficient of the friction element and the actuator 160 may be determined by experiment, and the determined dynamic characteristic coefficient may be previously stored in, or be accessible by, the transmission control unit 150.

Here, the dynamic characteristic coefficient may be a characteristic for a discharge flow rate of the actuator 160 and a charging time of the friction element (e.g., clutch) and the characteristic may be quantified into the dynamic characteristic coefficient by the experiment. The dynamic characteristic coefficient may be experimentally gathered by an assembly in which the friction element and the actuator are integrally combined in the producing process. Accordingly, the dynamic characteristic coefficient may be the dynamic characteristic for the automatic transmission single part.

The transmission control unit 150 may correct the compensation value depending on the dynamic characteristic coefficient to output, or when outputting, the control signal. In this case, the compensation value depending on the dynamic characteristic coefficient may be previously stored to the transmission control unit 150 as a map table according to the control duty and the fill time. In the present disclosure, to correct the size of the control duty and the fill time according to the dynamic characteristic coefficient may be referred to as a basic correction.

As shown in FIG. 5, the compensation value to correct the size of the control duty and the fill time based on the dynamic characteristic coefficient of the friction element and the actuator may be previously stored to, or accessible by, the transmission control unit 150 in a form of a map table.

For example, if the dynamic characteristic coefficient of the friction element and the actuator of the certain vehicle is '9', the basic compensation value of the size of the control duty may be 0.2%, and the basic compensation value for the fill time may be 10 ms. Accordingly, the transmission control unit 150 may increase the size of the control duty by 0.2% and the fill time by 10 ms to output, or before outputting, the control signal.

If the dynamic characteristic coefficient of the friction element and the actuator of the certain vehicle is '4', the basic compensation value of the size of the control duty may be −0.3%, and the basic compensation value for the fill time may be −15 ms. Accordingly, the transmission control unit 150 may decrease the size of the control duty by 0.3% and the fill time by 15 ms to output, or before outputting, the control signal.

As described above, by controlling the control signal (the size of the control duty and the fill time) depending on the dynamic characteristic coefficient reflected by the dynamic characteristic of the friction element (e.g., the clutch) and the actuator, the shift feel of the vehicle may be improved.

The transmission control unit 150 may additionally correct the control signal according to a shift type. Accordingly, the correction of the control signal according to a shift type may be referred to as a shift type correction. The shift type may include an up shift, a down shift, a kick down shift, a skip down shift, and a skip up shift.

That is, the correction coefficient depending on the shift type may be previously stored in, or accessible by, the transmission control unit 150 in a map table. The map table may be previously stored in, or accessible by, the transmission control unit 150 by the experiment, or experimental data, considering a deviation of a friction element and an actuator.

The transmission control unit 150 may output the final control signal by reflecting the correction coefficient depending on, or as a function of, the shift type to the compensation value by the dynamic characteristic coefficient. In this case, the transmission control unit 150 may output the control signal by adding the correction coefficient depending on the shift type to the compensation value by, or based on, the dynamic characteristic coefficient.

Referring to FIG. 5 and FIG. 6, it may be assumed that the dynamic characteristic coefficient of the friction element and the actuator is '8' and the shift type is the up shift.

In this case, the basic compensation value for the size of the control duty may be 0.1% and the basic compensation value for the fill time may be 5 ms. Also, the compensation value for the size of the control duty in the shifting of the up shift may be 0.1%, and the compensation value for the fill time may be 0 ms.

Accordingly, the transmission control unit 150 may increase the size of the control duty by 0.2% by adding the compensation value (0.1%) in the shifting comprising an up shift to the basic compensation value (0.1%) for the size of the control duty, and the transmission control unit 150 may increase the fill time by 5 ms to output the control signal by adding the compensation value (0 ms) in the shifting comprising an up shift to the basic compensation value (5 ms) for the fill time.

Hereinafter, a control method of an automatic transmission according to an exemplary embodiment of the present disclosure will be described with reference to accompanying drawings.

Figure 7:
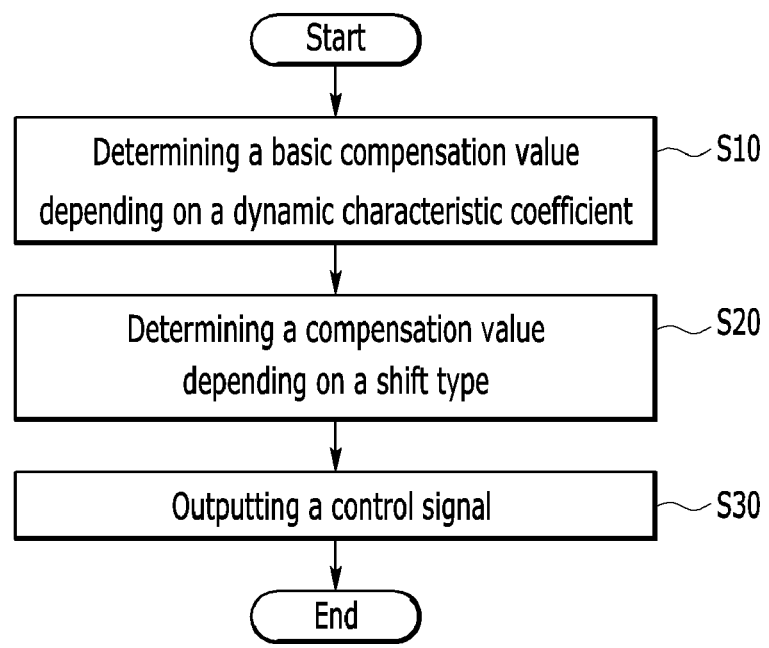
FIG. 7 is a flowchart showing a control method of an automatic transmission according to an exemplary embodiment of the present disclosure.

FIG. 7 is a flowchart showing a control method of an automatic transmission according to an exemplary embodiment of the present disclosure.

As shown in FIG. 7, the transmission control unit 150 may detect the dynamic characteristic coefficient of the friction element and the actuator and determine the basic compensation value depending on the dynamic characteristic coefficient (S10). The basic compensation value depending on the dynamic characteristic coefficient and the dynamic characteristic coefficient may be determined by experiment as described above and, may be previously stored in, or accessible by, the transmission control unit 150 (referring to FIG. 5).

The transmission control unit 150 may determine the shift type, and determine the compensation value depending on the shift type (S20). As described above, the compensation value depending on the shift type may be determined by experiment and may be previously stored in, or accessible by, the transmission control unit 150 in a map table form (referring to FIG. 6).

The transmission control unit 150 may correct the control signal (the size of the control duty and the fill time) by reflecting the basic compensation value depending on a dynamic characteristic and a compensation value depending on a shift type, thereby outputting the final control signal (S30).

As described above, according to the control apparatus and the method thereof of the automatic transmission according to an exemplary embodiment of the present disclosure, by correcting a control signal depending on the dynamic characteristic and the shift type of the friction element and the actuator, a shift feel may be improved.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A control method comprising:
    determining a base control signal for controlling a hydraulic pressure supplied to a friction element through an actuator by a transmission control unit;
    determining a basic compensation value based on a dynamic characteristic coefficient of the friction element and the actuator by the transmission control unit;
    determining a compensation value based on a shift type by the transmission control unit; and
    outputting a corrected control signal that corrects the base control signal by using the basic compensation value and the compensation value depending on the shift type by the transmission control unit.

2. The control method of claim 1, wherein the basic compensation value based on the dynamic characteristic coefficient is determined by experiment and is stored in the transmission control unit in a map table.

3. The control method of claim 1, wherein the compensation value based on the shift type is determined by experiment and is stored the transmission control unit in a map table.

4. The control method of claim 1, wherein the control signal is a size of a control duty and a fill time applied to the actuator in an early stage of shifting.

* * * * *